(12) United States Patent
Reichard

(10) Patent No.: US 9,750,184 B2
(45) Date of Patent: Sep. 5, 2017

(54) MOWER DECK WITH TILTED IDLE PULLEYS

(71) Applicant: KUBOTA CORPORATION, Osaka (JP)

(72) Inventor: Maxwell Reichard, Gainesville, GA (US)

(73) Assignee: KUBOTA CORPORATION, Osaka (JP)

( * ) Notice: Subject to any disclaimer, the term of this patent is extended or adjusted under 35 U.S.C. 154(b) by 0 days.

(21) Appl. No.: 14/757,574

(22) Filed: Dec. 24, 2015

(65) Prior Publication Data

US 2017/0181376 A1    Jun. 29, 2017

(51) Int. Cl.
| | |
|---|---|
| *A01D 34/76* | (2006.01) |
| *A01D 34/81* | (2006.01) |
| *A01D 34/66* | (2006.01) |
| *A01D 34/63* | (2006.01) |
| *A01D 101/00* | (2006.01) |

(52) U.S. Cl.
CPC ............. *A01D 34/76* (2013.01); *A01D 34/63* (2013.01); *A01D 34/66* (2013.01); *A01D 34/81* (2013.01); *A01D 2101/00* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,231,215 A | * | 11/1980 | Klas | A01D 34/30 56/11.6 |
| 4,813,215 A | * | 3/1989 | Chase | A01D 34/76 56/11.3 |
| 5,214,906 A | * | 6/1993 | Saki | A01D 34/685 56/13.6 |
| 5,361,566 A | * | 11/1994 | Hohnl | A01D 34/6806 56/11.6 |
| 6,176,071 B1 | | 1/2001 | Thorman et al. | |
| 8,763,355 B2 | | 7/2014 | Sugio | |
| 2015/0359169 A1 | * | 12/2015 | Weems | A01D 34/66 56/14.7 |

\* cited by examiner

*Primary Examiner* — Alicia Torres
(74) *Attorney, Agent, or Firm* — Greenblum & Bernstein, P.L.C.

(57) ABSTRACT

[Summary] A mower unit receiving power transmitted from a drive source includes a blade pulley mounted on a blade rotational shaft, an idle pulley unit, and a single belt routed around an output pulley of the drive source, the idle pulley unit and the blade pulley. The pulley height of the idle pulley unit is set higher than the pulley height of the blade pulley, and a belt portion of the belt running between the output pulley and the idle pulley unit extends to pass over and above the other belt portion.

20 Claims, 9 Drawing Sheets

MOWER DECK WITH TILTED IDLE PULLEYS

TECHNICAL FIELD

The present invention relates to a mower unit to be mounted on a traveling vehicle such as a tractor and relates also to a mower machine having such mower unit mounted thereto.

BACKGROUND ART

A mower unit includes a plurality of blades for securing a greater mowing width, so that rotational axes of the plurality of blades extend upwardly of a mower deck. For rotation of the blades, power of a power generating unit such as an engine is utilized. A mower unit disclosed in U.S. Patent Application Publication No. 6176071 employs a belt power transmission mechanism for power transmission, including a first belt transmission mechanism for transmitting rotation of an output pulley of a power generating unit to one blade rotational shaft and a second belt transmission mechanism for transmitting rotation of this blade rotational shaft to another blade rotational shaft. An idle pulley is provided for applying tension by means of a spring to both the first belt transmission mechanism and the second belt transmission mechanism. With provision of the two belt transmission mechanisms, stable power transmission is sought for. However, the presence of the two belt transmission mechanisms is problematic in the respects of cost and space required therefor.

A grass mower machine having only one belt transmission mechanism is disclosed in U.S. Patent Application Publication No. 8763355. According to this grass mower machine, a length of belt entrained around an output pulley mounted on an engine output shaft extends to a mower unit which is disposed on a front side of a machine body and this belt is then changed in direction firstly by two idle pulleys (a fixed idle pulley and a pivotal idle pulley) to a left-right direction of the machine body to be routed around a plurality of blade pulleys. In this arrangement, the distance between the output pulley and the idle pulleys for change of direction is relatively short. So, in the event of lifting up/down of the mower unit by a large stroke, the tilting of the belt portion entrained around the output pulley is large, so there is the possibility of the load applied to its belt portion becoming significant.

SUMMARY

Thus, there is a need for improvement in layout of the blade pulley and the idle pulley in a mower unit implementing a belt transmission mechanism.

A mower unit according to the present invention configured such that power from a drive source is transmitted via a belt transmission mechanism, comprises:

a mower deck liftable up/down by a lift mechanism;

a plurality of blade rotational shafts extending through a top plate of the mower deck perpendicularly;

a plurality of blade pulleys mounted on the respective blade rotational shafts;

an idle pulley unit; and a single belt routed around an output pulley of the drive source, the idle pulley unit, and the blade pulleys;

wherein a pulley height of the idle pulley unit is set higher than a pulley height of the blade pulleys; and a belt portion of the belt running between the output pulley and the idle pulley unit extends to pass over and above the other belt portion.

With the mower unit configured as described above, a routing operation of the belt is effected in an overhead crossing manner at a position where the belt portion passes over and above the belt per se. Thus, there is obtained greater freedom in the routing of the belt. In particular, if the blade pulleys are disposed between the output pulley and the idle pulley unit, there can be secured a long distance between the output pulley and the idle pulley unit for change of direction of the belt. This will contribute to increase of the lift stroke of the mower unit without providing any inconvenience to belt power transmission.

A load due to tilting of the belt for allowing one part of the belt to pass over and above the other part of the belt can be reduced by tilting a pulley pivot axis of the idle pulley.

The idle pulley unit includes an idle pulley (tension pulley) which is movable in such a manner to increase a running length of the belt. Then, by setting a moving direction of this movement of the tension pulley for increasing the running length of the belt to be oriented toward an outer side of the mower deck, the problem relating to space associated with the pulley movement can be reduced.

The present invention comprises also a mower machine with the above-described mower unit mounted thereto.

EMBODIMENTS

Figure 1:
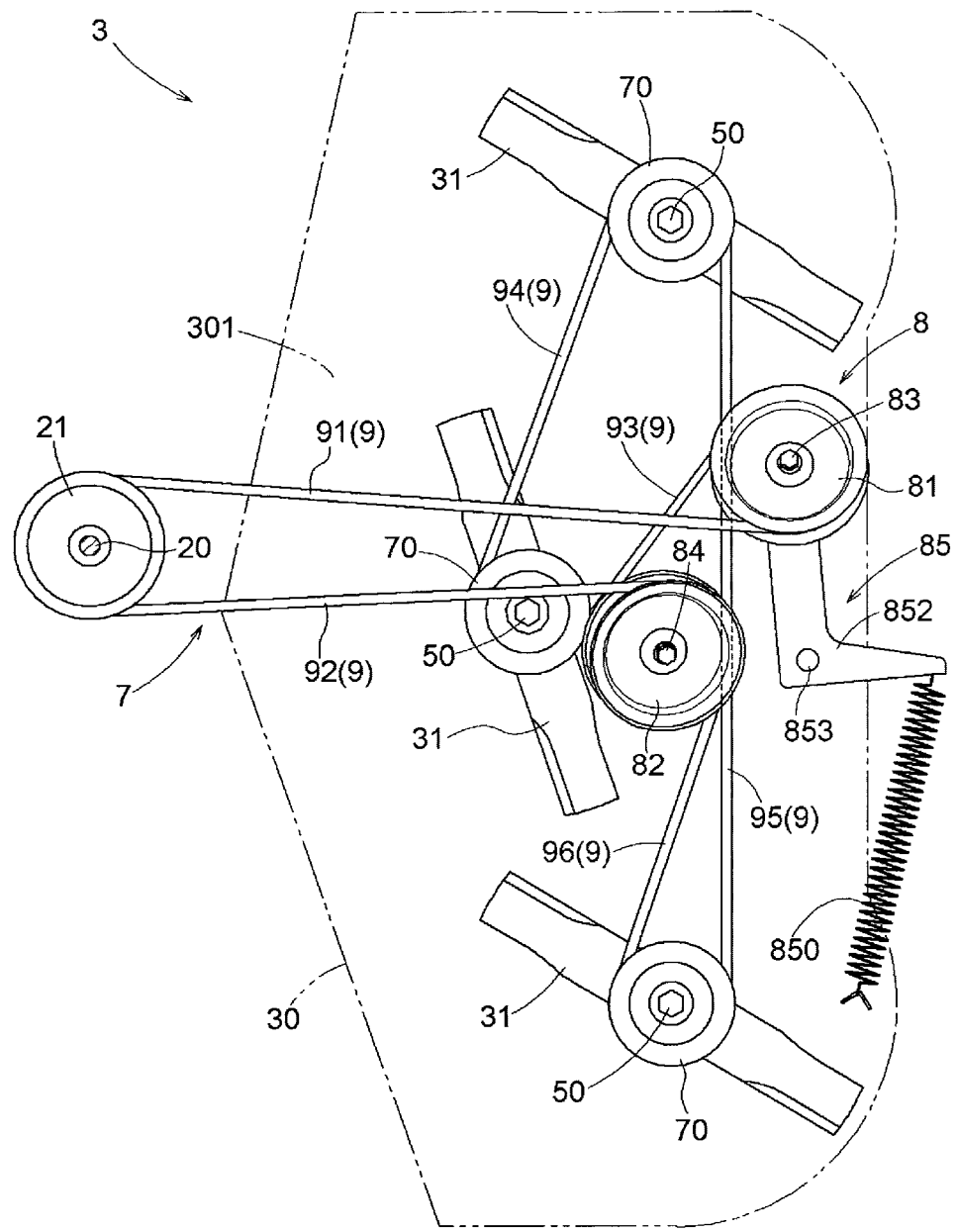
FIG. 1 is a schematic for explaining a basic configuration of a belt transmission mechanism included in a mower unit according to the present invention.

A basic configuration of a belt transmission mechanism included in a mower unit according to the present invention will be explained with reference to FIG. 1. A mower unit 3 illustrated in FIG. 1 includes three plate-like blades 31 disposed side by side inside a mower deck 30. Each blade rotational shaft 50 for rotating each corresponding blade extends vertically through a top plate 301 of the mower deck 30 towards the upper side.

The blade rotational shaft 50 receives power via a belt transmission mechanism 7 from an output shaft 20 of an engine or a motor which constitutes a drive source. The belt transmission mechanism 7 consists essentially of an output pulley 21 secured to the output shaft 20, a blade pulley 70 secured to an upper end of the blade rotational shaft 50, an idle pulley unit 8 and a belt 9. In this belt transmission mechanism 7, the belt 9 comprises a single length (loop) of belt, so that this single belt 9 is routed around the output pulley 21, the blade pulley 70, and the idle pulley unit 8.

The idle pulley unit 8 provides a function of changing the direction of the belt 9 and a further function of applying a tension to the belt 9 by increasing the running length of the belt 9. In the case of the example illustrated in FIG. 1, the idle pulley unit 8 includes a tension idle pulley 81 engaged with a belt portion 91 fed from the output pulley 21 and a normal idle pulley 82 engaged with a belt portion 92 running toward the output pulley 21.

In the case of the example illustrated in FIG. 1, the tension pulley unit 81 having both the function of direction changing of the belt 9 and the further function of applying tension to the belt 9 is disposed at a rear end region of the mower deck 30, which is a position more distant from the output pulley 21 than any one of the blade pulleys 70. Whereas, the normal idle pulley 82 having only the function of direction changing of the belt 9, but not having the further function of applying tension to the belt 9 is disposed on a further front side than the tension idle pulley 81 and at a central region of the mower deck 30.

A belt portion 93 exiting the tension idle pulley 81 of the idle pulley unit 8 is entrained around one blade pulley 70 and a further belt portion 94 exiting therefrom is entrained around another blade pulley 70 and a still further belt portion 95 exiting therefrom is entrained around still another blade pulley 70 and extends as a belt portion 96 back to the normal idle pulley 82 of the idle pulley unit 8. The belt 9 used in this belt transmission mechanism 7 is routed in a three-dimensional manner. In the case of the example illustrated in FIG. 1, the belt portion 93 passes over and above the belt portion 95. Further, the belt portion 91 passes over and above the belt portion 93, the belt portion 94 and the belt portion 95. And, the belt portion 92 passes over and above the belt portion 93 and the belt portion 94. The belt portion 96 passes over and above the belt portion 95. With these arrangements, the pulley heights of the tension idle pulley 81 and the normal idle pulley 82 together constituting the idle pulley unit 8 (the heights as measured from the top plate 301 of the mower deck 30) are set higher than the pulley heights of the blade pulleys 70 (the height as measured from the top plate 301 of the mower deck 30).

Since the heights of the tension idle pulley 81 and the normal idle pulley 82 measured from the top plate 301 are higher than the heights of the blade pulleys 70, the belt portion 93 and the belt portion 96 are under significantly tilted postures. The belt portion 91 and the belt portion 92 respectively has a long distance to the output pulley 21, so their inclined postures are not so steep. Then, in order to avoid inconvenience such as deformation or derailment of the belt which may result from such steep belt tilted posture as above, a pulley support shaft 83 for the tension idle pulley 81 and a pulley support shaft 84 for the normal idle pulley 82 respectively is disposed vertically with a predetermined tilt angle. This respective tilt angle is preferably equal to or slightly smaller than the tilt angle of the belt portion 93 or the belt portion 96.

In order to provide the tension idle pulley 81 with the function of applying a tension to the belt 9, there is needed a movement mechanism 85 for moving the tension idle pulley 81 in such a manner to increase the running length of the belt 9. To this end, if the movement mechanism 85 is configured to move the tension idle pulley 81 towards the outer side of the mower deck 30, this will reduce the possibility of movement of the tension idle pulley 81 interfering with a member present on the mower deck 30. In order to constantly apply a tension to the belt 9, the movement mechanism 85 can be configured to press the tension idle pulley 81 against the belt 9 with a spring force.

The movement mechanism 85 illustrated in FIG. 1 is of a pivot arm type. The tension idle pulley 81 attached to a tension arm 852 which is a pivot arm is movable in a direction for pressing the belt 9. The force for pressing the belt 9 comes from a spring 843. The moving direction of the tension idle pulley 81 is the direction exiting from the mower deck 30.

Figure 2:
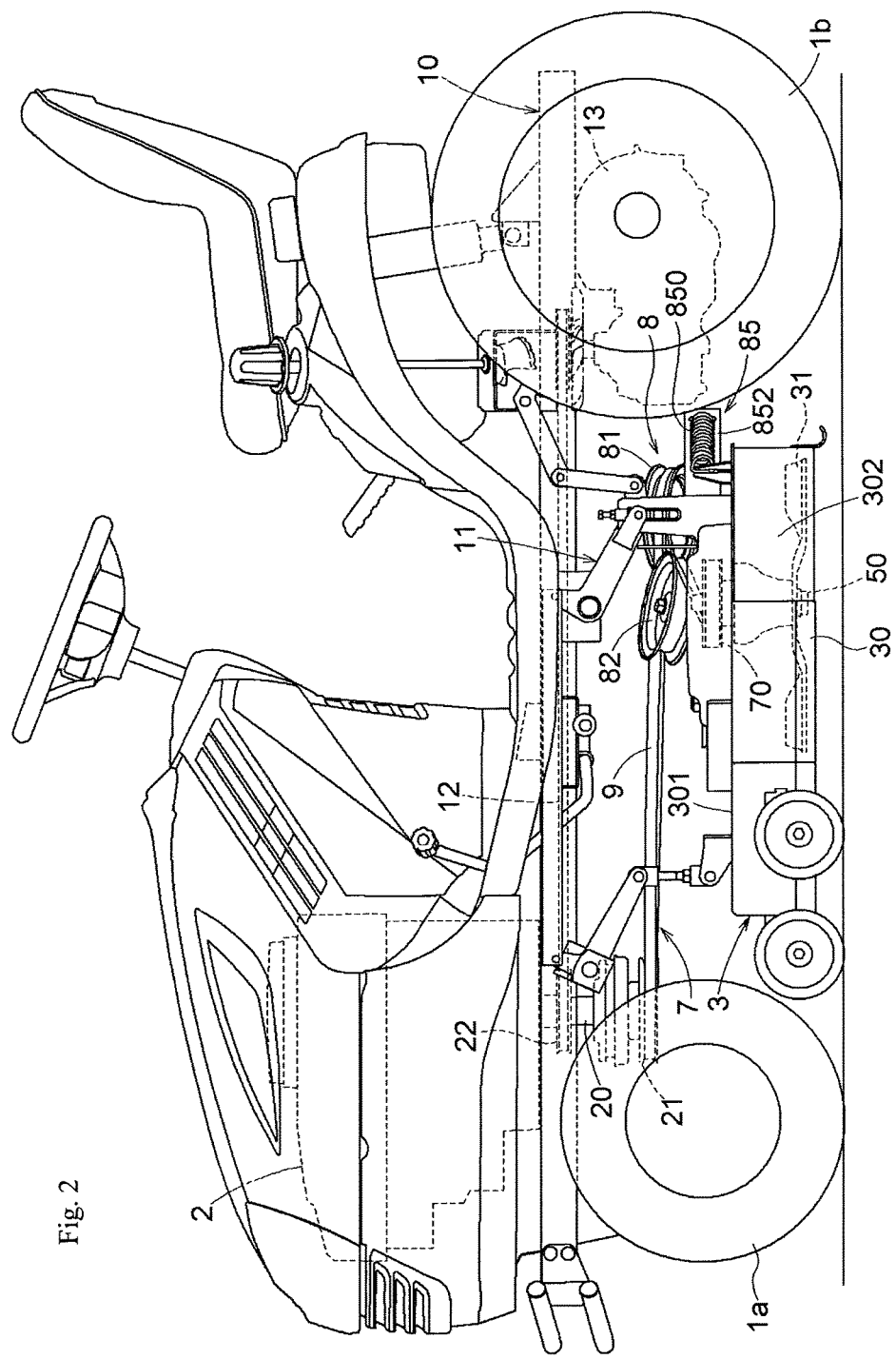
FIG. 2 is a side view showing one embodiment of a mower machine having the inventive mower unit mounted thereto.

Next, a specific embodiment of the present invention will be explained with reference to accompanying drawings. Here, the mower unit 3 relating to the present invention is mounted on a grass mower vehicle as shown in FIG. 2. This grass mower vehicle is a riding type grass mower vehicle (machine) having a pair of left and right front front wheels 1*a*, a pair of left and right rear wheels 1*b*, and a traveling vehicle body 10 supported by the front and rear wheels 1*a*, 1*b*. In this disclosure, unless indicated otherwise, a language "front" refers to the front side relating to a vehicle body front-rear direction (traveling direction) and a language "rear" refers to the rear side relating to the vehicle body front-rear direction (traveling direction). Further, a left-right direction or a lateral direction means a vehicle body transverse direction (vehicle body width direction) perpendicular to the vehicle body front-rear direction. And, a language "upper" or "lower refers to a positional relation in a vehicle body perpendicular direction (vertical direction) and denotes a relation respecting the ground height.

Figure 3:
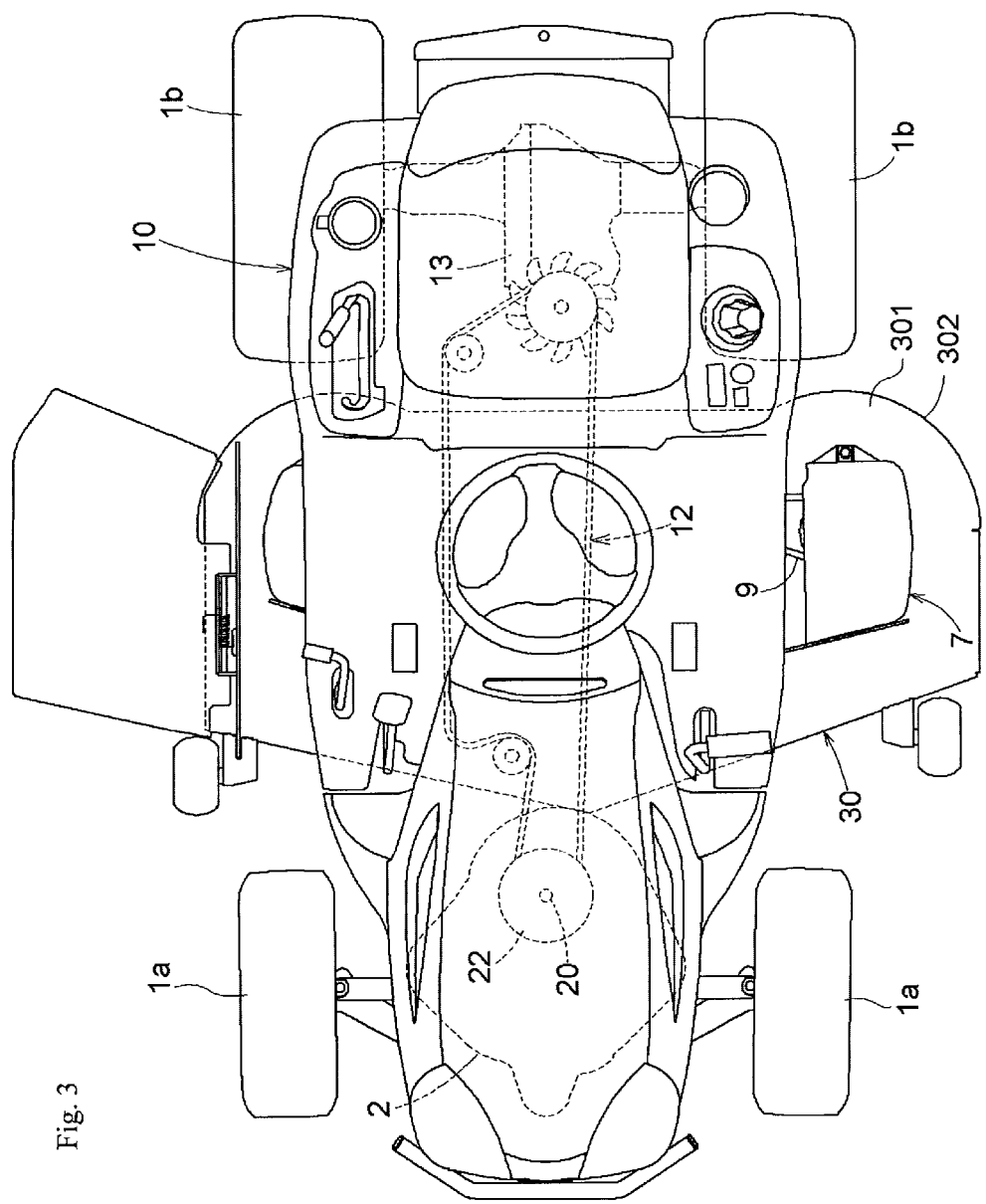
FIG. 3 is a plane view of the mower machine.

As shown in FIG. 2 and FIG. 3, the grass mower vehicle includes the traveling vehicle body 10 having the steerable front wheels 1*a*, the non-steerable and drivable rear wheels 1*b* and the mower unit 3 suspended from a lower portion of the traveling vehicle body 10 between the front wheels 1*a* and the rear wheels 1*b* in such a manner that the mower unit 3 can be lifted up/down via a link type lift mechanism 11. At a font portion of the traveling vehicle body 10, a vertical shaft type engine 2 is mounted. From an output shaft 20 protruding downwards from the engine 2, a rotational power is transmitted to a transmission 13 via a traveling belt transmission mechanism 12 and transmitted also to the mower unit 3 via a mower belt transmission mechanism 7 (to be referred to simply as "the belt transmission mechanism 7" hereinafter). The traveling transmission mechanism 12 and the mower belt transmission mechanism 7 are disposed horizontally. As shown in FIG. 3, the traveling belt transmission mechanism 12 transmits rotational power from a traveling pulley 22 attached to the output shaft 20 to an input pulley 23 provided in the transmission 13. The transmission 13 incorporates a speed changer device for changing a speed ratio in accordance with an operational amount of a speed changing tool operable by a driver.

Figure 4:
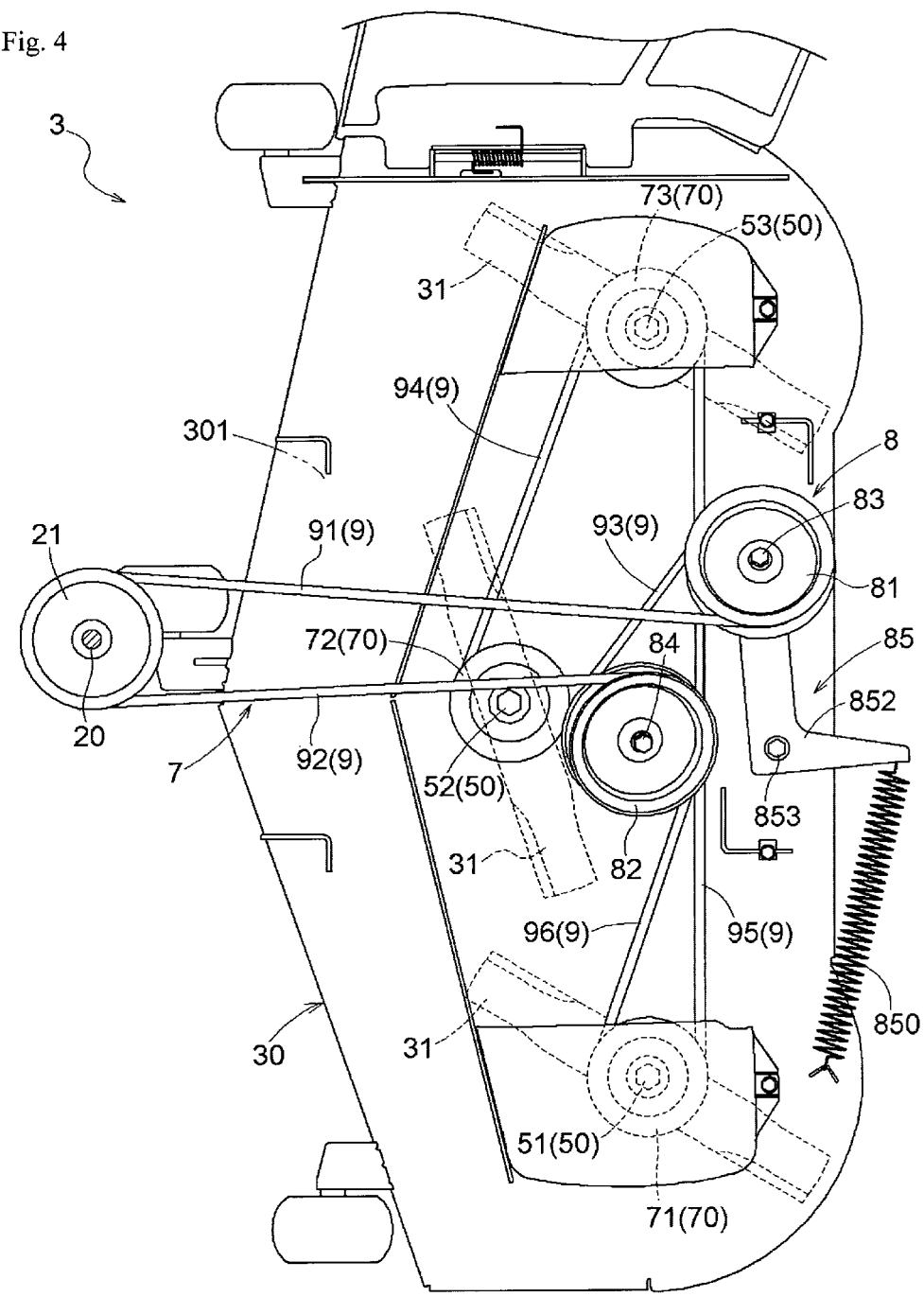
FIG. 4 is a belt layout diagram of the mower machine.
Figure 5:
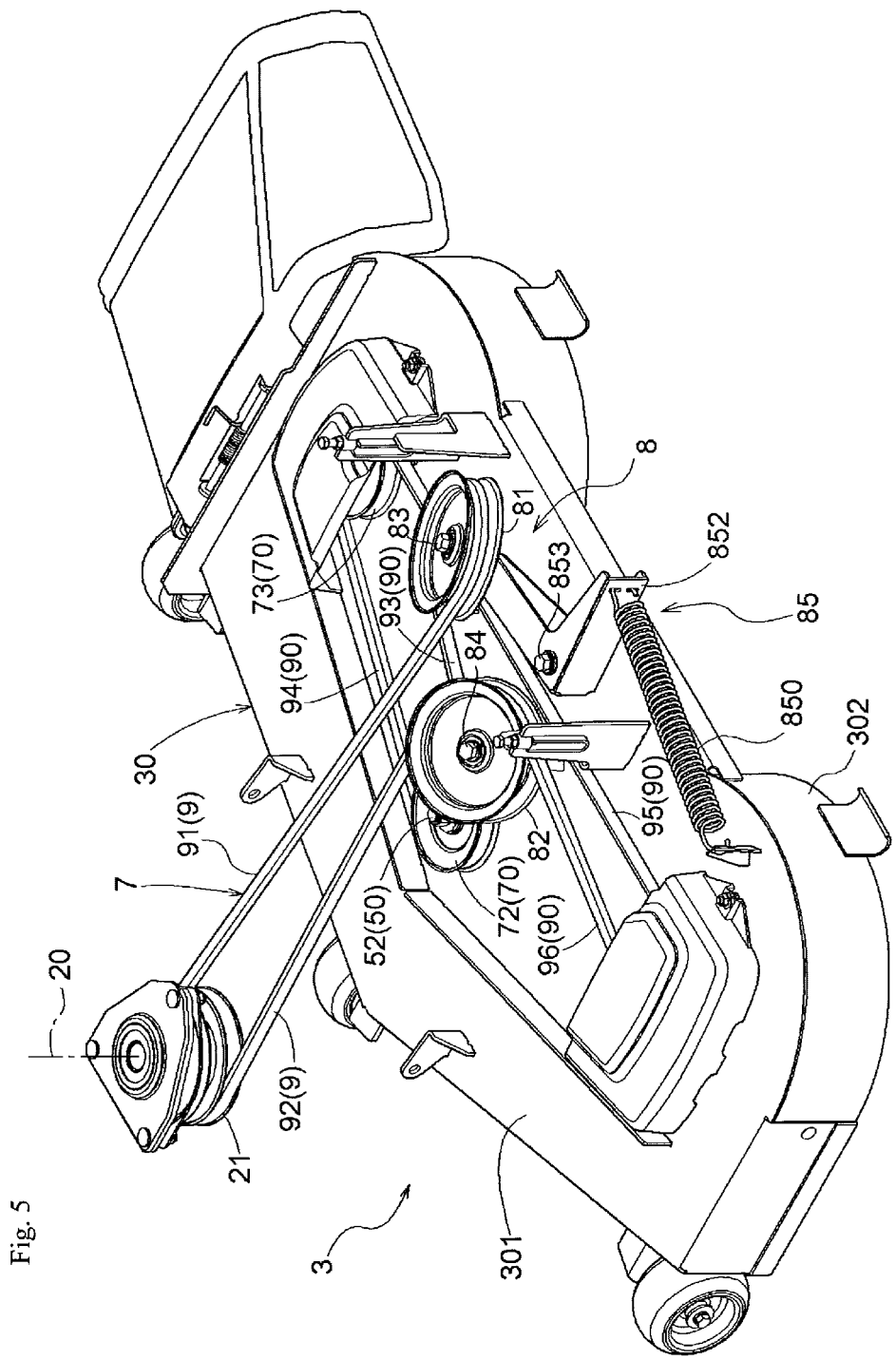
FIG. 5 is a perspective view of the mower unit.
Figure 6:
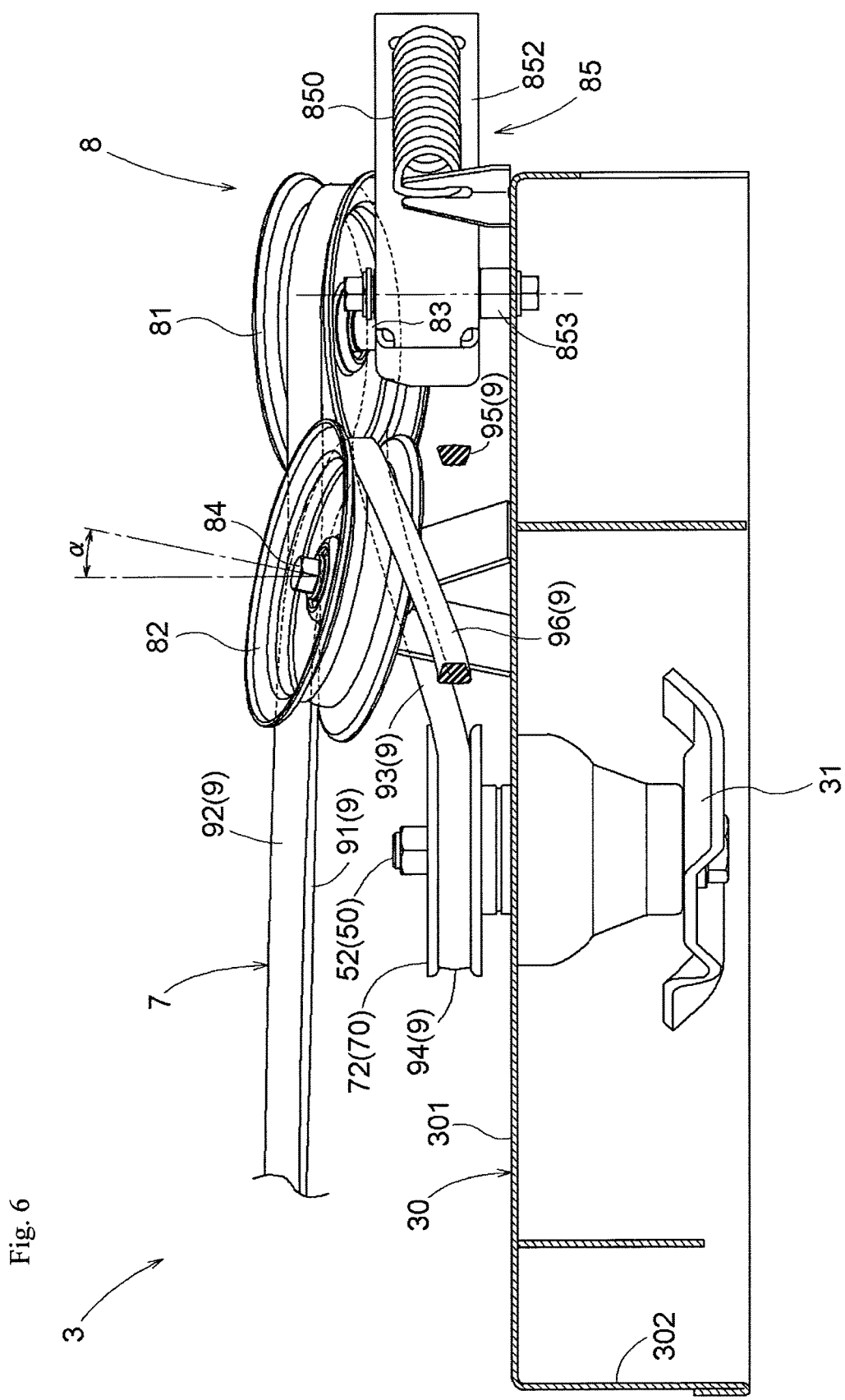
FIG. 6 is a side view in partial cross section showing a tilted posture of a normal idle pulley.
Figure 7:
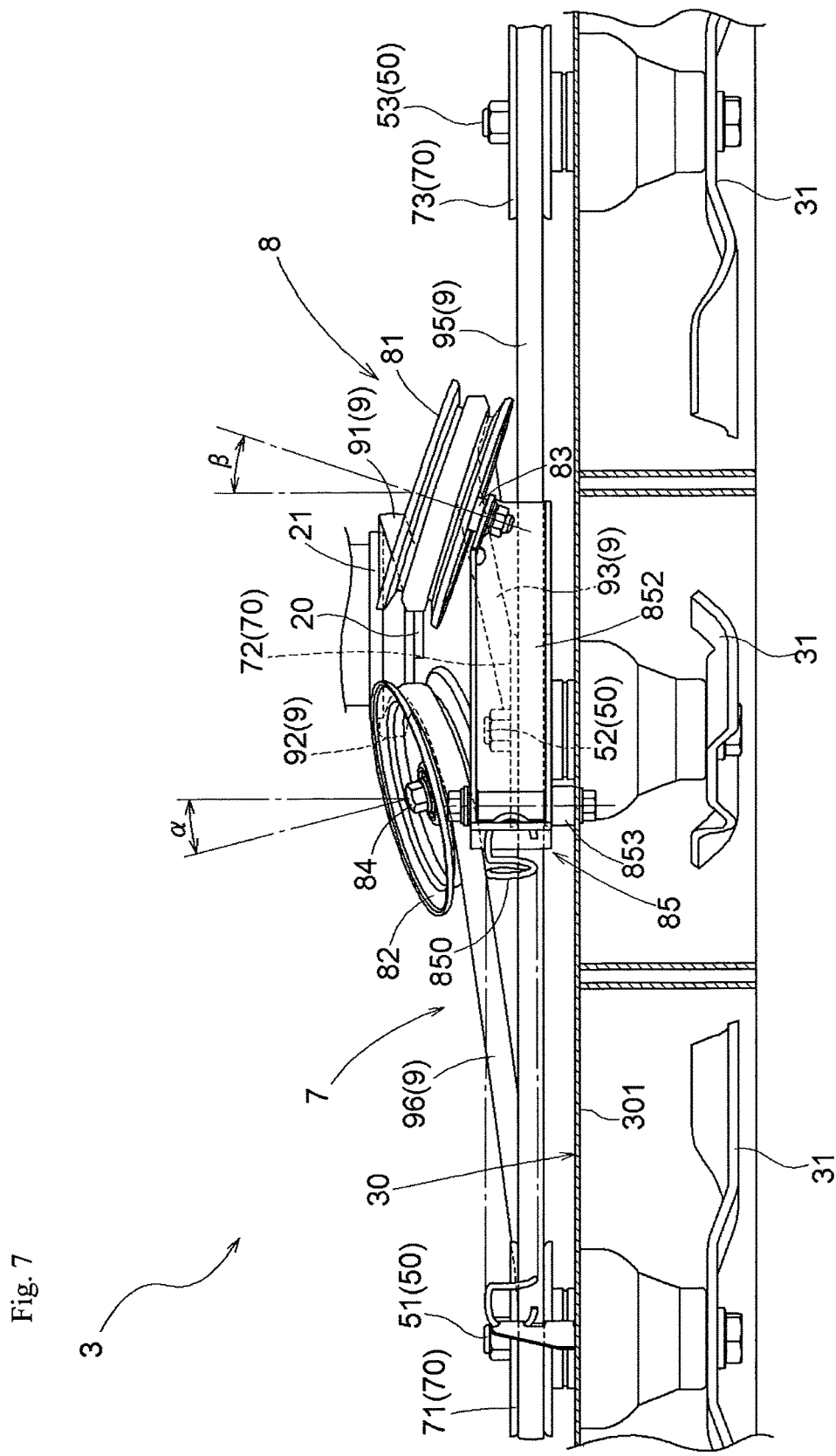
FIG. 7 is a side view in partial cross section showing tilted postures of the normal idle pulley and a tension idle pulley.
Figure 8:
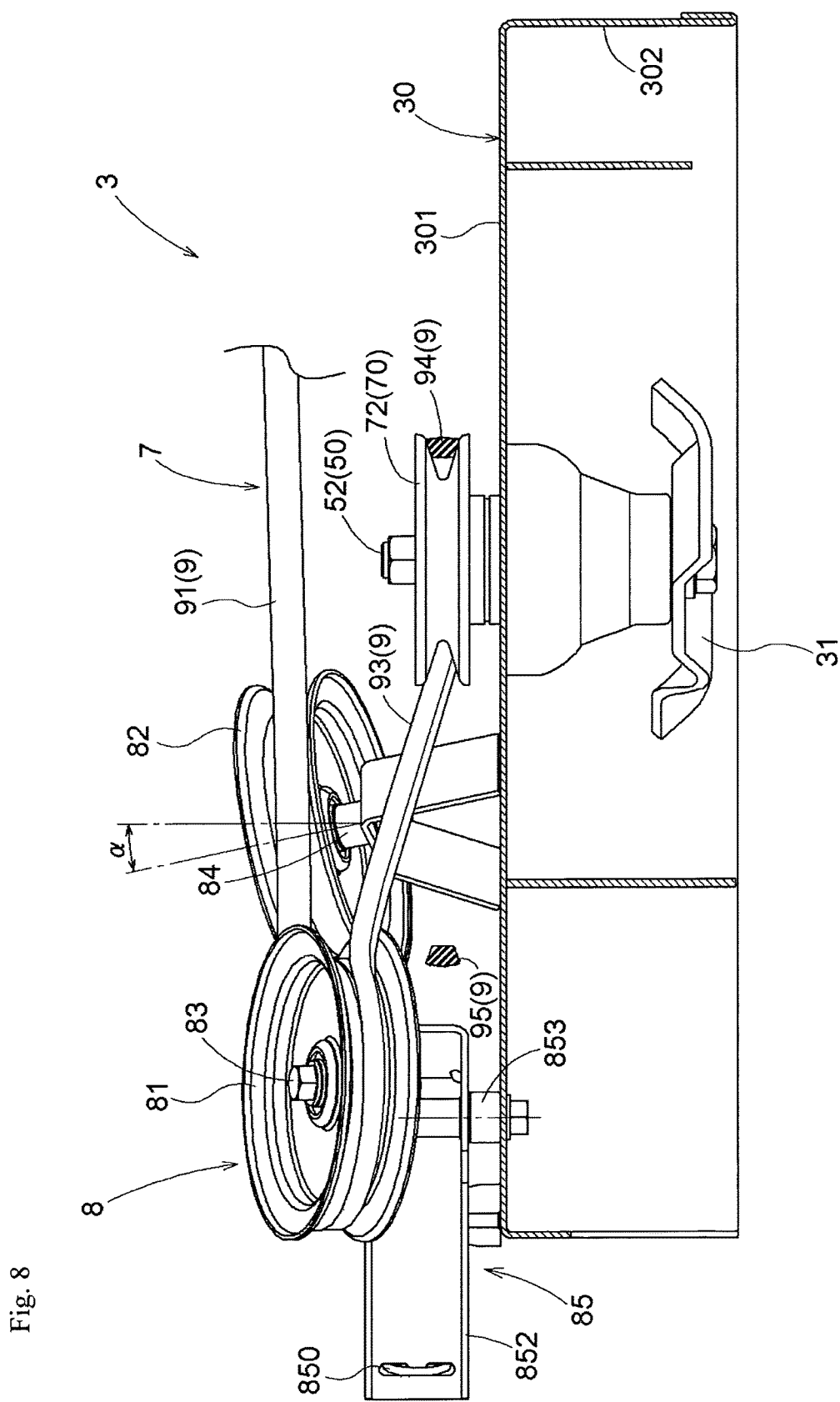
FIG. 8 is a side view in partial cross section showing the tilted posture of the tension idle pulley.

The belt transmission mechanism 7 in this embodiment employs substantially the basic configuration described above with reference to FIG. 1. FIG. 4 shows the mower deck 30, the belt transmission mechanism 7 and a routing layout of the belt 9 in the belt transmission mechanism 7. FIG. 5 shows a perspective view of the mower unit 3. FIG. 6 is a side view in partial section showing the idle pulley unit 8 as viewed from the right side, showing a tilted posture of the normal idle pulley 82. FIG. 7 is a side view in partial section showing the idle pulley unit 8 as viewed from the rear side, showing tilted postures of the normal idle pulley 82 and the tension idle pulley 81. FIG. 8 is a side view in partial section showing the idle pulley unit 8 as viewed from the left side, showing the tilted posture of the tension idle pulley 81.

The mower unit 3 includes the mower deck 30 consisting essentially of the top plate 301 and the side plate 302. In an inside space created by the top plate 301 and a side plate 302, there are accommodated the three blades 31 disposed side by side along the vehicle body transverse direction. Each blade 31 is fixed to a lower end of one of the three blade rotational shafts 50 rotatably supported to the top plate 301 of the mower deck 3. Here, the three blade rotational shafts 50 will be referred to respectively as a first rotational shaft 51, a second rotational shaft 52, and a third rotational shaft 53 in the order from the left side. As shown in FIG. 4 and FIG. 5, to an upper end of the first rotational shaft 51, a first blade pulley 71 as a blade pulley 70 is attached. To an upper end of the second rotational shaft 52, a second blade pulley 72 as another blade pulley 70 is attached. And, to an upper end of the third rotational shaft 53, a third blade pulley 73, as still another blade pulley 70 is attached. Namely, the three blade pulleys 70 are disposed slightly upwardly of the top plate 301. Incidentally, the first rotational shaft 51 located on the left side of the second rotational shaft 52 and the third rotational shaft 53 located on the right side of the same are located at a substantially same position relative to the vehicle body front-rear direction. Whereas, the second rotational shaft 52 is located on a more front side in the vehicle body front-rear direction than the first rotational shaft 51 and the third rotational shaft 53.

The belt transmission mechanism 7 for transmitting engine power to the blades 31 of the mower unit 3 includes the single belt 9. The idle pulley unit 8 includes the tension idle pulley 81 for effecting both change of direction of the belt 9 and application of tension to the belt 9, and the normal idle pulley 82 for effecting only change of direction of the belt 9. In this regard, in the instant embodiment, the tension idle pulley 81 which applies a tension to the belt 9 is disposed at the center in the vehicle body transverse direction of the mower deck 30 and at the rear end in the vehicle body front-rear direction. The normal idle pulley 82 is disposed more rearward in the vehicle body front-rear direction than any one of the first blade pulley 71, the second blade pulley 72 and the third blade pulley 73 and receives the belt 9 paid out from the output pulley 21. Also, the normal idle pulley 82 is disposed rearwardly of the second blade pulley 72 and disposed substantially side by side with the first blade pulley 71 and the third blade pulley 73 and pays out the belt 9 to the output pulley 21. And, this normal idle pulley 82 is rotatably supported on the pulley support shaft 84 provided in the mower deck 30. The tension idle pulley 81 is moved by the movement mechanism 85 in such a manner to press the belt 9, thus applying a tension to this belt 9.

The movement mechanism 85 includes a spring 850 and the tension arm 852 in the form of boomerang. The tension arm 852 is pivotally attached to the mower deck 30 via a pivot shaft 853 having a vertical axis at the center portion thereof. To one end of the tension arm 852, the tension idle pulley 81 is rotatably attached. And, to the other end of the tension arm 852, one end of the spring 850 is connected. The other end of this spring 850 is fixed to the mower deck 30 via a bracket. The spring 850 extends substantially in the vehicle body transverse direction at the rear end region of the mower deck 30. With the above-described arrangement, the movement mechanism 85 presses the tension idle pulley 81 against the belt 9, thus applying a tension to this belt 9.

The belt transmission mechanism 7 receives power from the engine 2 via the output pulley 21 attached to the output shaft 20 downwardly of the traveling pulley 22. As shown in FIG. 4, the belt 9 exits the output pulley 21 and then extends to be routed around the tension idle pulley 81, the second blade pulley 72, the fourth blade pulley 74, the third blade pulley 73, the first blade pulley 71 and the normal idle pulley 82 in this mentioned order and then extends back to the output pulley 21. In this arrangement, also, like FIG. 1, a belt 9 portion between the output pulley 21 and the tension idle pulley 81 will be referred to as the belt portion 91, a belt 9 portion between the normal idle pulley 82 and the output pulley 81 will be referred to as the belt portion 92. Further, the belt 9 portion between the tension idle pulley 81 and the second blade pulley 72 will be referred to as the belt portion 93, and the belt 9 portion between the second blade pulley 72 and the third blade pulley 73 will be referred to as the belt portion 94. Further, the belt 9 portion between the third blade pulley 73 and the first blade pulley 71 will be referred to as the belt portion 95, and the belt 9 portion between the first blade pulley 71 and the normal idle pulley 82 will be referred to as the belt portion 96.

As may be clearly understood from FIG. 6, FIG. 7 and FIG. 8, the belt portion 95 extends between the tension idle pulley 81 and the normal idle pulley 82 substantially along the vehicle body transverse direction. Therefore, the belt portion 91 and the belt portion 92 pass over and above the belt portion 93 and the belt portion 94. Further, the belt portion 91 and the belt portion 93 pass over and above the belt portion 95. Also, the belt portion 96 passes substantially above the belt portion 95. With these arrangements, the heights of the tension idle pulley 81 and the normal idle pulley 82 of the idle pulley unit 8 above the mower deck 30 (or the ground heights) are higher than the heights of the first blade pulley 71, the second blade pulley 72 and the third blade pulley 73 above the mower deck 30 (or the ground heights).

As the belt portion 93 and the belt portion 96 are relatively short, tilts thereof required for allowing these belt portions to pass over and above the other belt portions are significant. For this reason, the pulley support shaft 83 for the tension idle pulley 81 and the pulley support shaft 84 for the normal idle pulley 82 extend with predetermined tilt angles β and α respectively relative to the vertical axis. In the instant embodiment, the tilt angle β of the pulley support shaft 83 is set substantially equal to the tilt angle of the belt portion 93, whereas the tilt angle α of the pulley support shaft 84 is set substantially equal to the tilt angle of the belt portion 96. Alternatively, the tilt angles α and β of the pulley support shaft 83 and the pulley support shaft 84 can be set same, thus realizing commonization of the shaft tilting arrangements.

Figure 9:
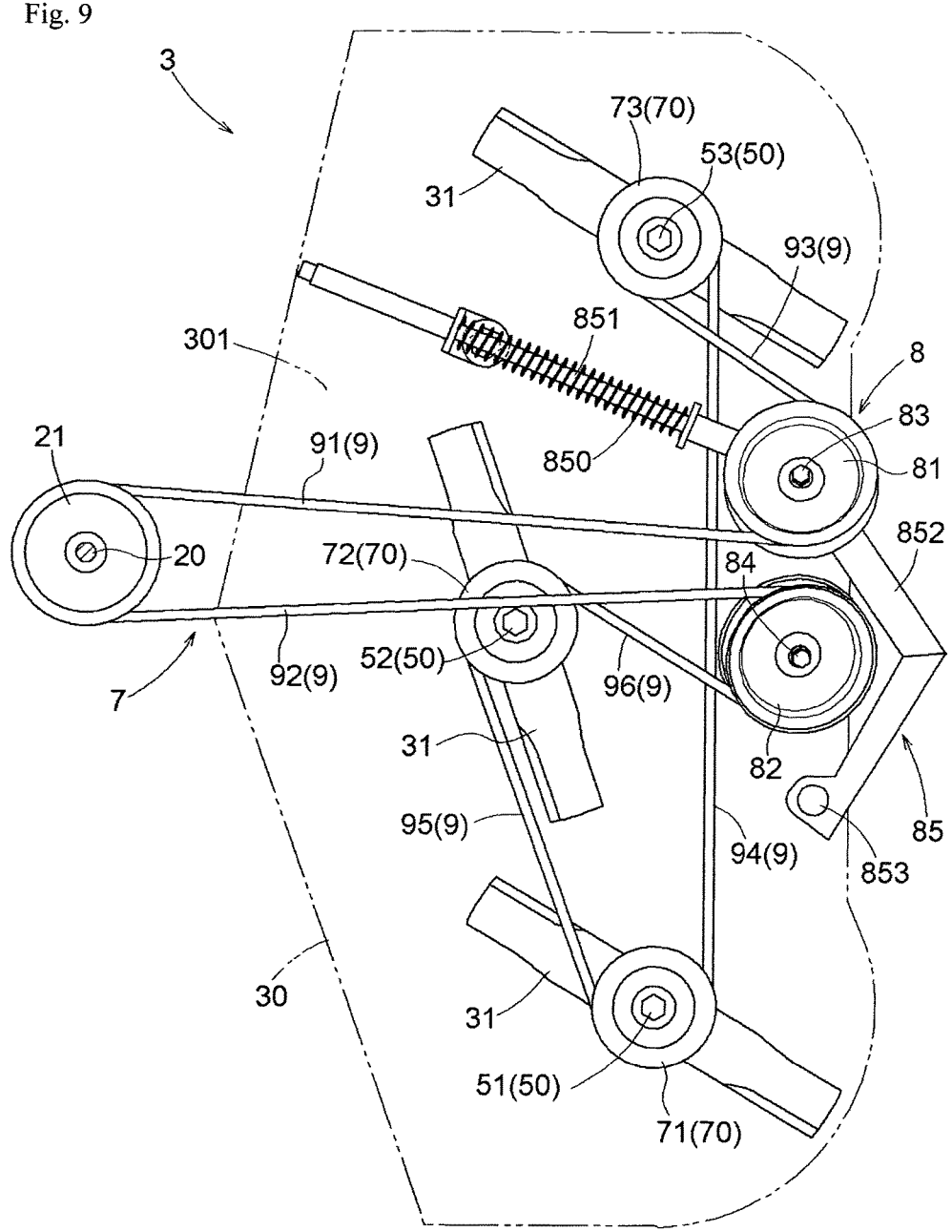
FIG. 9 is a belt layout diagram according to a further embodiment.

FIG. 9 shows a belt routing diagram different from the belt routing diagram of the belt 9 in the belt transmission mechanism 7 shown in FIG. 1 and FIG. 8. In this further embodiment too, the belt transmission mechanism 7 employs a single belt 9 and this single belt 9 is routed around the output pulley 21, the blade pulleys 70 and the idle pulley unit 8.

In this further embodiment, both of the tension idle pulley 81 and the normal idle pulley 82 together constituting the idle pulley unit 8 are disposed at the center in the vehicle body transverse direction of the mower deck 30 and at the rear end in the vehicle body front-rear direction. In this further embodiment, the belt 9 exits the output pulley 21 and then is routed around the output pulley 21, the blade pulleys 70, the tension idle pulley 81, the third blade pulley 73, the first blade pulley 71, the second blade pulley 72 and the normal idle pulley 82 in this mentioned order. Here, the belt 9 portion between the output pulley 21 and the tension idle pulley 81 will be referred to as the belt portion 91, and the belt 9 portion between the normal idle pulley 82 and the output pulley 21 will be referred to as the belt portion 92. Further, the belt 9 portion between the tension idle pulley 81 and the third blade pulley 73 will be referred to as the belt portion 93 and the belt 9 portion between the third blade pulley 73 and the first blade pulley 71 will be referred to as the belt portion 94. Also, the belt 9 portion between the first blade pulley 71 and the second blade pulley 72 will be referred to as the belt portion 95, and the belt 9 portion between the second blade pulley 72 and the normal idle pulley 82 will be referred to as the belt portion 96.

Here, the belt portion 91, the belt portion 92, the belt portion 93 and the belt portion 96 pass over and above the belt portion 94. Therefore, like the foregoing embodiment, the heights of the tension idle pulley 81 and the normal idle pulley 92 as measured from the top plate 301 of the mower deck 30 are set higher than the heights of the first blade pulley 71, the second blade pulley 72 and the third blade pulley 73. Therefore, the belt portion 93 and the belt portion 96 assume tilted postures, so that the pulley support shaft 83 for the tension idle pulley 81 and the pulley support shaft 84 for the normal idle pulley 82 are disposed with the tilt angles β and α. Preferably, each of these tilt angles β and α is equal to or slightly smaller than the tilt angle of the short belt portion 93 or belt portion 96.

A movement mechanism 85 in this further embodiment is also configured as the pivot arm type. However, this movement mechanism 85 includes a compression spring 850, a guide rod 851 and a tension arm 852. The guide rod 851 extends substantially along the belt portion 91 running between the output pulley 21 and the tension idle pulley 81. The tension arm 852 is supported to the mower deck 30 which is pivotable about the pivot shaft 853 having a vertical axis. To this tension arm 852, the normal idle pulley 82 is rotatably supported via the pulley support shaft 83. The compression spring 850 is fitted on the guide rod 851 which is slidably supported to a bracket fixed to the mower deck 30. The spring force of the compression spring 850 acts to pivot the tension arm 852 via the guide rod 851, whereby the normal idle pulley 82 presses the belt 9, thus applying a tension to this belt 9. The tension arm 852 extends substantially along the rear end of the mower deck 30, and the guide rod 851 extends substantially along the vehicle body front-rear direction. With this arrangement, the locus of movement of the normal idle pulley 82 extends from the rear end of the mower deck 30 to the outer side of the mower deck 30, so that movement of the normal idle pulley 82 is prevented from interfering with any member present on the mower deck 30.

As the belt 9 of the belt transmission mechanism 7, various kinds such as a toothed belt (timing belt) can be employed. Its material is not limited to synthetic resin, but can be metal. Furthermore, the present invention does not exclude use of a chain or the like as the "belt 9". That is, the belt transmission mechanism 7 as used in the present invention is inclusive of a chain transmission mechanism also.

The mower unit 3 in the foregoing embodiment is the three blades type. However, the present invention is applicable also to two blades type, or four or more blades type. The essential feature of the present invention lies in that power transmission from the engine 2 to all of the blades 31 is effected by the single belt 9 and this belt 9 is routed in a three-dimensional layout, that is, with a certain belt portion passing over and above another or other belt portions.

In the grass mower vehicle in the above-described embodiment, the engine 2 is disposed at a front portion of the traveling vehicle body 10.

Instead, the engine 2 may be disposed at a rear portion Further, in the foregoing, the mower unit 3 is disposed between the front wheels 1a and the rear wheels 1b. Instead, the mower unit 3 can be disposed forwardly of the front wheels 1a.

DESCRIPTION OF REFERENCE MARKS/NUMERALS

3: mower unit
7: belt transmission mechanism (mower belt transmission mechanism)
8: idle pulley unit
9: belt
20: output shaft
21: output pulley
22: traveling pulley
23: input pulley
30: mower deck
31: blade
50: blade rotational shaft
51: first rotational shaft
52: second rotational shaft
53: third rotational shaft
70: blade pulley
71: first blade pulley
72: second blade pulley
73: third blade pulley
74: fourth blade pulley
81: tension idle pulley
82: normal idle pulley
83: pulley support shaft
84: pulley support shaft
85: movement mechanism
91: belt portion
92: belt portion
93: belt portion
94: belt portion
95: belt portion
96: belt portion
301: top plate
302: side plate
843: spring
850: spring (compression spring)
851: guide rod
852: tension arm
853: pivot arm

The invention claimed is:
1. A mower unit receiving power transmitted from a drive source, comprising:
   a mower deck liftable up/down by a lift mechanism;
   a plurality of blade rotational shafts extending through a top plate of the mower deck perpendicularly;
   a plurality of blade pulleys mounted on the respective blade rotational shafts;
   an idle pulley unit comprising plural tilted pulleys with non-parallel tilt axes; and
   a single belt routed around an output pulley of the drive source, the idle pulley unit, and the blade pulleys;
   wherein a pulley height of the idle pulley unit is set higher than a pulley height of the blade pulleys; and
   a belt portion of the belt running between the output pulley and the idle pulley unit extends to pass over and above the other belt portion.
2. The mower unit according to claim 1, wherein:
   the plural tilted pulleys are a tilted tension idle pulley and a tilted normal idle pulley.

3. The mower unit according to claim 2, wherein the tension idle pulley is disposed at a position more distant from the output pulley than the blade pulleys.

4. The mower unit according to claim 2, wherein the tension idle pulley and the normal idle pulley are disposed at positions more distant from the output pulley than the blade pulleys.

5. The mower unit according to claim 2, further comprising a movement mechanism configured to move the tension idle pulley toward an outer side of the mower deck so as to increase a running length of the belt.

6. A mower machine having a mower unit configured to rotate a blade by a rotational power from an engine, the mower unit comprising:
a mower deck liftable up/down by a lift mechanism;
a plurality of blade rotational shafts extending through a top plate of the mower deck perpendicularly;
a plurality of blade pulleys mounted on the respective blade rotational shafts;
an idle pulley unit comprising plural tilted pulleys with tilt axes that tilt away from each other relative to a vertical axis of an output pulley of the engine; and
a single belt routed around the output pulley of the engine, the idle pulley unit, and the blade pulleys;
wherein a pulley height of the idle pulley unit is set higher than a pulley height of the blade pulleys; and
a belt portion of the belt running between the output pulley and the idle pulley unit extends to pass over and above the other belt portion.

7. The mower machine according to claim 6, wherein:
the plural tilted pulleys include a tilted tension idle pulley and a tilted normal idle pulley; and
a pulley support shaft for the tension idle pulley and a pulley support shaft for the normal idle pulley have axes tilted relative to vertical axes of the blade pulleys.

8. The mower machine according to claim 7, wherein the tension idle pulley is disposed at a position more distant from the output pulley than the blade pulleys.

9. The mower machine according to claim 7, wherein the tension idle pulley and the normal idle pulley are disposed at positions more distant from the output pulley than the blade pulleys.

10. The mower machine according to claim 7, further comprising a movement mechanism configured to move the tension idle pulley toward an outer side of the mower deck so as to increase a running length of the belt.

11. A mower unit, comprising:
a height adjustable mower deck;
a plurality of blade rotational shafts extending through a top plate of the mower deck;
a plurality of blade pulleys mounted on the respective blade rotational shafts;
a first pulley that rotates about a first axis that is tilted relative to axes of the blade rotational shafts;
a second pulley that rotates about a second axis that is tilted relative to axes of the blade rotational shafts;
the first and second axes being non-parallel to one another and tilting away from each other;
a single belt having:
a first belt portion configured to pass around an output pulley of a drive source and pass around the first and second pulleys; and
a second belt portion that passes around each of the blade pulleys;
a pulley height of the first and second pulleys being higher than a pulley height of the blade pulleys; and
a portion of the first belt portion running between the output pulley and the first and second pulleys passes over and above a portion of the second belt portion.

12. The mower unit according to claim 11, wherein:
the first pulley is a tension or spring biased idle pulley; and
the second pulley is a fixed axis idle pulley.

13. The mower unit according to claim 11, wherein the first pulley is disposed at a position more distant from the output pulley than the blade pulleys.

14. The mower unit according to claim 11, wherein the first and second pulleys are disposed at positions more distant from the output pulley than the blade pulleys.

15. The mower unit according to claim 11, wherein the first and second axes are spaced from an axis of the output pulley by different amounts.

16. The mower unit according to claim 11, further comprising a movement mechanism movably mounted to the mower deck and configured to move the first pulley away from the output pulley.

17. The mower unit according to claim 11, wherein
the second pulley is coupled to a mount that is fixed to the mower deck; and
the first pulley is coupled to a pivotally mounted tension mechanism.

18. The mower unit according to claim 11, wherein
the second pulley is coupled to a mount that is fixed to the mower deck; and
the first pulley is coupled to a pivotally mounted mechanism that adjusts a position of the second pulley relative to the mower deck.

19. The mower unit according to claim 11, wherein
the plurality of blade rotational shafts comprises three blade rotation shafts;
the plurality of blade pulleys comprises three blade pulleys;
the second pulley is coupled to a mount that is fixed to the mower deck;
the first pulley is coupled to a pivotally mounted tension mechanism that adjusts a position of the second pulley relative to the mower deck.

20. The mower unit according to claim 11, wherein the single drive belt:
passes around more than half of the drive pulley;
passes around more than half of the first pulley; and
passes around more than half of each of the blade pulleys.

* * * * *